United States Patent
Gong et al.

(10) Patent No.: US 12,287,608 B2
(45) Date of Patent: Apr. 29, 2025

(54) IMAGE PROJECTION METHOD AND SYSTEM

(71) Applicant: Lenovo (Beijing) Limited, Beijing (CN)

(72) Inventors: Jiangtao Gong, Beijing (CN); Liuxin Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 712 days.

(21) Appl. No.: 17/654,277

(22) Filed: Mar. 10, 2022

(65) Prior Publication Data
US 2023/0076136 A1    Mar. 9, 2023

(30) Foreign Application Priority Data
Sep. 6, 2021    (CN) .......................... 202111038005.X (51) Int. Cl.
G03H 1/22        (2006.01)
G03H 1/00        (2006.01)

(52) U.S. Cl.
CPC ... G03H 1/2294 (2013.01); *G03H 2001/0088* (2013.01)

(58) Field of Classification Search
None
See application file for complete search history.

(56) References Cited

U.S. PATENT DOCUMENTS

| | | | |
|---|---|---|---|
| 10,670,862 B2 * | 6/2020 | Vallius | G02B 27/4205 |
| 2017/0153599 A1 * | 6/2017 | Gill | G03H 1/0443 |
| 2018/0101018 A1 * | 4/2018 | Chung | G02B 30/27 |
| 2019/0346598 A1 * | 11/2019 | Gill | G02B 5/1814 |
| 2020/0033619 A1 * | 1/2020 | Fattal | G02B 6/004 |
| 2022/0225479 A1 * | 7/2022 | Hikmet | H05B 45/3577 |

FOREIGN PATENT DOCUMENTS

CN        112950791 A     6/2021

* cited by examiner

*Primary Examiner* — Robert E. Tallman
(74) *Attorney, Agent, or Firm* — ANOVA LAW GROUP, PLLC (57) ABSTRACT

An image cast system includes: a transparent holographic display screen; a first diffraction grating superimposed at a first display surface of the transparent holographic display screen; a second diffraction grating superimposed at a second display surface of the transparent holographic display screen; a plurality of cast light sources including a cast light source disposed outside and facing towards the transparent holographic display screen or a cast light source disposed inside the transparent holographic display screen; and a control device connected to the transparent holographic display screen, the first diffraction grating, the second diffraction grating, and the plurality of cast light sources. The control device controls at least one cast light source of the plurality of cast light sources to cast a virtual scene image onto the first display surface of the transparent holographic display screen; and outputs an electrical control signal to the second diffraction grating.

14 Claims, 7 Drawing Sheets

IMAGE PROJECTION METHOD AND SYSTEM

CROSS-REFERENCE TO RELATED APPLICATION

This application claims priority to Chinese Patent Application No. 202111038005.X, filed on Sep. 6, 2021, the entire content of which is incorporated herein by reference.

TECHNICAL FIELD

The present disclosure relates to the technical field of display technologies and, more particularly, to an image cast method and system.

BACKGROUND

Application scenarios of technologies such as mixed reality increase day by day.

In the application scenarios of the mixed reality and augmented reality, both virtual objects and real objects are present at the same time, and a virtual scene seen by users at different locations is the same, such that methods for displaying virtual scene images in the mixed reality scenario are relatively simple and lack of flexibility.

SUMMARY

One aspect of the present disclosure provides an image cast system. The system includes: a transparent holographic display screen; a first diffraction grating superimposed at a first display surface of the transparent holographic display screen; a second diffraction grating superimposed at a second display surface of the transparent holographic display screen; a plurality of cast light sources including a cast light source disposed outside and facing towards the transparent holographic display screen or a cast light source disposed inside the transparent holographic display screen; and a control device connected to the transparent holographic display screen, the first diffraction grating, the second diffraction grating, and the plurality of cast light sources. The control device controls at least one cast light source of the plurality of cast light sources to cast a virtual scene image onto the first display surface of the transparent holographic display screen; and outputs an electrical control signal to the second diffraction grating to control at least one sub-grating area, of the second diffraction grating, in a light cast area of the at least one cast light source to be in an opaque state, such that the at least one sub-grating area blocks the virtual scene image cast by the at least one cast light source to make the virtual scene image invisible on the second display surface.

Another aspect of the present disclosure provides an image cast method. The method includes: determining a virtual scene image to be cast onto a first display surface of a transparent holographic display screen, the transparent holographic display screen including the first display surface, a second display surface, a first diffraction grating superimposed at the first display surface, and a second diffraction grating superimposed at the second display surface; controlling at least one cast light source of a plurality of cast light sources to cast the virtual scene image onto the first display surface; and outputting an electrical control sub-signal to the second diffraction grating to control at least one sub-grating area, of the second diffraction grating, in a light cast area of the at least one cast light source to be in an opaque state, such that the at least one sub-grating area blocks the virtual scene image cast by the at least one cast light source to make the virtual scene image invisible on the second display surface.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

The terms "first," "second," "third," "fourth," etc. (if any) in the description and claims and the above-described drawings are used to distinguish similar parts and not necessarily to describe a particular order or sequence. It should be understood that data so used may be interchanged under appropriate circumstances so that the embodiments of the application described herein can be practiced in sequences other than those illustrated herein.

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure.

Figure 1:
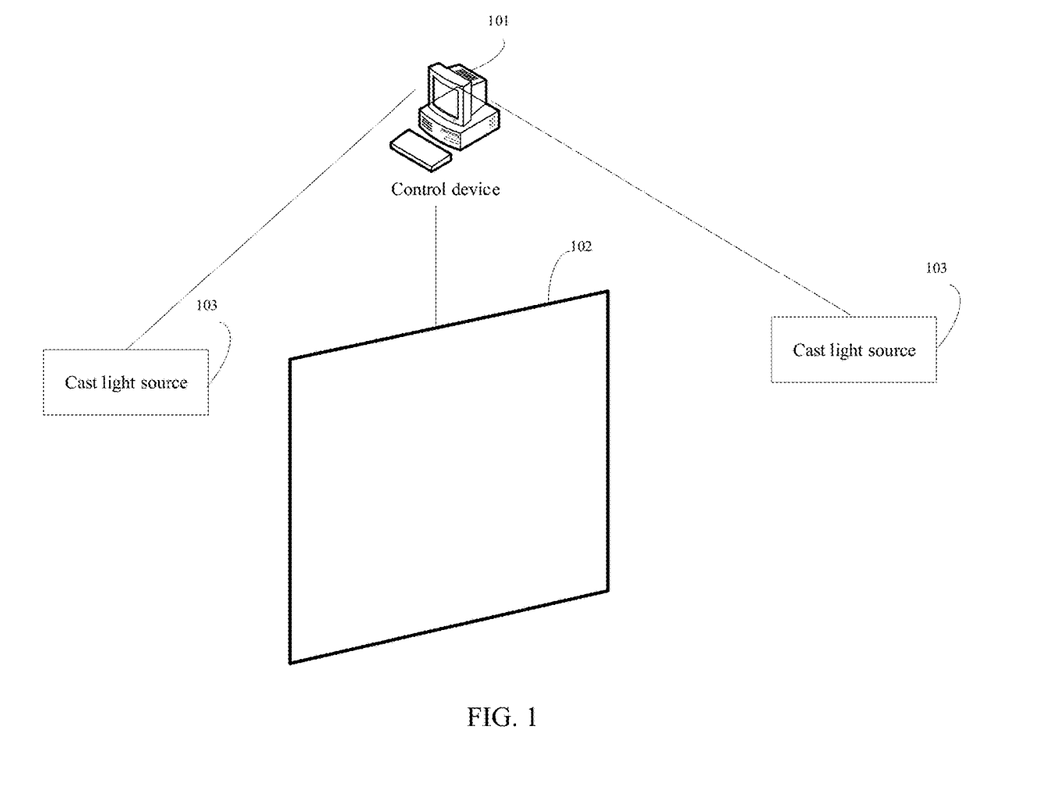
FIG. 1 is a schematic structural diagram of an exemplary image cast system (i.e., image projection system) according to some embodiments of the present disclosure.

FIG. 1 is a schematic structural diagram of an exemplary image cast system according to some embodiments of the present disclosure. As shown in FIG. 1, the image cast system includes a control device 101, a transparent holographic display screen 102, a first diffraction grating, a second diffraction grating, and a plurality of cast light sources 103. The transparent holographic display screen 102, the first diffraction grating, the second diffraction grating, and the plurality of cast light sources 103 are connected to the control device 101. The image cast system includes one or more control devices 101. When the image cast system includes multiple control devices, the multiple control devices form a cluster or a distributed system.

In some embodiments, the transparent holographic display screen 102 includes two display surfaces. The two display surfaces may be two display planes of the transparent holographic display screen 102. One display surface of the transparent holographic display screen 102 is shown in FIG. 1. Another display surface of the transparent holographic display screen 102 is at the back of the one display surface. For convenience of differentiation, the one display surface of the transparent holographic display screen 102 is called a first display surface, and the other display surface is called a second display surface. Diffraction gratings are superimposed on both display surfaces of the transparent holographic display screen 102. For convenience of diffraction differentiation, one diffraction grating superimposed on the first display surface of the transparent holographic display screen is called a first diffraction grating, and the other diffraction grating superimposed on the second display surface of the transparent holographic display screen is called a second diffraction grating. The diffraction gratings are a type of grating that undergoes periodic spatial modulation of at least one of amplitude or phase of an incident light through a regular structure.

In some embodiments, the diffraction grating superimposed on the first surface of the transparent holographic display screen 102 is a diffraction grating with adjustable diffraction coefficient. Thus, the diffraction grating can change light diffraction in different grating areas and achieve changing light transmittance of corresponding grating areas.

Because the diffraction grating includes small and dense slits, even if the diffraction grating is superimposed on the display surface of the transparent holographic display screen 102, the diffraction grating is invisible from user's perspective. Correspondingly, the diffraction grating superimposed on the transparent holographic display screen 102 is not shown in FIG. 1.

In one embodiment, the cast light sources 103 may include a cast light source disposed outside the transparent holographic display screen 102 and facing toward the transparent holographic display screen 102. One or more of the plurality of cast light sources 103 face toward the first display surface of the transparent holographic display screen 102, and another one or more of the plurality of cast light sources 103 face toward the second display surface of the transparent holographic display screen 102. For example, as shown in FIG. 1, the cast light sources 103 are located outside the transparent holographic display screen 102.

In one embodiment, the cast light sources 103 are a cast light source disposed inside the transparent holographic display screen 102. For example, the cast light sources may be organic light-emitting diodes (OLEDs) disposed inside the transparent holographic display screen 102, and image can be cast onto the transparent holographic display screen 102 through OLED light emitting points. The plurality of cast light sources 103 in the transparent holographic display screen 102 have different cast directions. For example, one or more of the plurality of cast light sources 103 are mainly used to cast images to the first display surface of transparent holographic display screen 102 while another one or more of the plurality of cast light sources 103 are mainly used to cast images to the second display surface of transparent holographic display screen 102.

In some embodiments, under the circumstance that the plurality of cast light sources 103 are disposed inside the transparent holographic display screen 102, the plurality of cast light sources 103 are actually connected to the control device 101 through the transparent holographic display screen 102.

In some embodiments, the control device 101 controls at least one first cast light source from the plurality of cast light sources 103 to cast a first virtual scene image onto the first display surface of the transparent holographic display screen 102, and outputs a first electrical control sub-signal to the second diffraction grating. The first electrical control sub-signal is configured to control at least one first sub-grating area of the second diffraction grating in a light cast area of the at least one first cast light source to be in an opaque state, such that the at least one first sub-grating area blocks the first virtual scene image cast by the at least one first cast light source, thereby making the first virtual scene image invisible on the second display surface.

In some embodiments, the at least one first cast light source belongs to some cast light sources from the plurality of cast light sources capable of casting a virtual image onto the first display surface. For example, the control device can select some cast light sources as first cast light sources from the plurality of cast light sources capable of casting the virtual image on the first display surface as needed, and can control each of the first cast light sources to cast the virtual scene image that needs to be presented on the first display surface.

For convenience of differentiation, in the embodiments of the present disclosure, the virtual scene image presented on the first display surface is referred to as the first virtual scene image, and the cast light sources that cast the first virtual scene image onto the first display surface are referred to as the first cast light sources.

In some embodiments, the first virtual scene image may be determined through combining one or more of a historical virtual scene image outputted by the transparent holographic display screen before a current moment and an input operation by a user on the first display surface, which is not limited thereto.

It should be understood that although the first cast light sources are casting toward or primarily casting toward the first display surface of the transparent holographic display screen, under the circumstance that at least one first cast light source casts the first virtual scene image onto the first display surface of the transparent holographic display screen, some first cast light sources may still cast onto the second display surface of the transparent holographic display screen. To improve privacy of presenting the virtual scene image and to make the virtual scene image presented on the first display surface of the transparent holographic display screen invisible on the second display surface, the first cast light sources need to be blocked from casting light toward the user at the side of the second display surface through the second display surface.

Correspondingly, to block the first cast light sources from casting onto the second display surface, a sub-grating area within a light cast area of the at least one first cast light source of the second diffraction grating superimposed on the second display surface needs to be determined. The sub-grating area determined here is a partial area of the second diffraction grating. For convenience of differentiation, the sub-grating area is called a first sub-grating area of the second diffraction grating.

Based on the above description, through outputting the first electrical control sub-signal to the second diffraction grating for adjusting the first sub-grating area to be in the opaque state, the first sub-grating area can be made to be in the opaque state, thereby blocking the first cast light sources from casting the first virtual scene image through the second display surface. Thus, the user at the side of the second display surface of the cannot see the first virtual scene image.

In the embodiments of the present disclosure, specific manners of the diffraction grating superimposed on the transparent holographic display screen may vary. Correspondingly, different specific manners of adjusting the diffraction coefficient of the diffraction grating may exist.

Several possible scenarios are described below.

In one embodiment, the second diffraction grating is a diffraction grating with adjustable grating spacing. For example, the grating pitch of the second diffraction grating is mechanically adjustable. In this case, the first electrical control sub-signal that the control device sends to the second diffraction grating may be a control instruction for instructing the second diffraction grating to adjust the grating spacing in the first sub-grating area until reaching the opaque state.

In one embodiment, the second diffraction grating is a diffraction grating with a controllable diffraction coefficient. Correspondingly, the first electrical control sub-signal is configured to control the diffraction coefficient of the at least one first sub-grating area of the second diffraction grating to be the diffraction coefficient corresponding to the opaque state.

For example, the second diffraction grating is an electrically controllable diffraction grating, and through adjusting driving voltages applied to different diffraction areas of the second diffraction grating, the diffraction coefficient of corresponding diffraction area can be adjusted. Based on the above description, the first electrical control sub-signal is configured to control a target driving voltage applied to the at least one first sub-grating area of the second diffraction grating. The diffraction coefficient of the grating area is the diffraction coefficient corresponding to the opaque state. In this case, the electrically controllable diffraction grating for adjusting the diffraction coefficient is described here for illustration purpose. In practical applications, the diffraction coefficient of the electrically controllable diffraction grating may be adjusted in other manners, which are not limited thereto. Similarly, the first diffraction grating may be a controllable diffraction grating, a diffraction grating with a controllable diffraction coefficient, or a diffraction grating with adjustable grating spacing.

It can be understood that because the first display surface can be any one of the display surfaces of the transparent holographic display screen, the image cast system of the present disclosure may cast the virtual scene image on any one of the display surfaces of the transparent holographic display screen, that cannot be seen from another one of the display surfaces of the transparent holographic display screen, such that the users at different display surface sides of the transparent holographic display screen can see different virtual scene images and at the same time the privacy of the virtual scene image presented on any one of the display surfaces of the transparent holographic display screen can be protected.

In the embodiments of the present disclosure, the image cast system includes the transparent holographic display screen. The diffraction gratings are superimposed on both sides of the transparent holographic display screen. In addition, the control device controls the at least one first cast light source in the plurality of cast light sources to cast onto the first display surface of transparent holographic display screen, and at the same time, sends the electrical control signal to the diffraction grating superimposed on the second display surface of the transparent holographic display screen. The electrical control signal controls at least one sub-grating area of the second diffraction grating in the light cast area of the at least one first cast light source to be in the opaque state. As such, when the virtual scene image is presented on one of the display surfaces of the transparent holographic display screen, the user at the other display surface side of the transparent holographic display screen cannot see the virtual scene image. Thus, different virtual scene images can be presented on the two display sides of the transparent holographic display screen, thereby improving variety and flexibility of presenting the virtual scene images.

Figure 2:
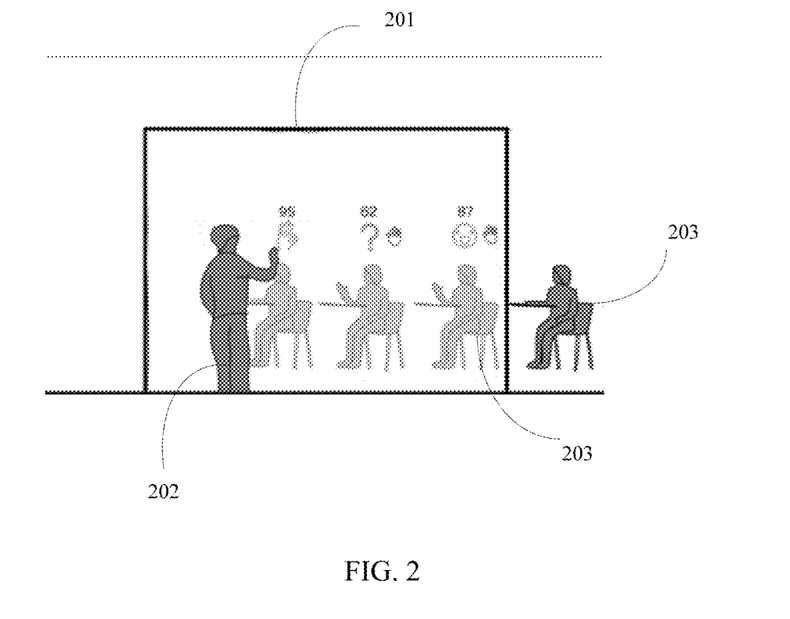
FIG. 2 is a schematic diagram showing an application scenario of an exemplary image cast system according to some embodiments of the present disclosure.

For convenience of understanding, advantages of the embodiments of the present disclosure are described below with reference to an application scenario. In one embodiment, the image cast system may be applied in a teaching scenario. In the teaching scenario, the transparent holographic display screen may replace a black board or a white board in a conventional classroom. FIG. 2 is a schematic diagram showing an application scenario of an exemplary image cast system according to some embodiments of the present disclosure.

As shown in FIG. 2, a teacher 202 and multiple students 203 are located at two display sides of the transparent holographic display screen 201. For convenience of understanding, the teacher 202 is located at a side of the first display surface of the transparent holographic display screen. Correspondingly, the multiple students 203 are located at a side of the second display surface of the transparent holographic display screen. The side of the first display surface is opposite to the side of the second display surface.

Because the transparent holographic display screen is transparent, the teacher 202 not only can see the virtual scene image presented on the first display surface of the transparent holographic display screen 201, but also can see the multiple students 203 in a real scene at the side of the second display surface of the transparent holographic display screen through transparent holographic display screen.

In this application scenario, if contents inputted by the teacher on the first display surface of the transparent holographic display screen can only be seen on the first display surface, and cannot be seen by the multiple students, the control device may determine the first virtual scene image to be presented on the first display surface based on the contents inputted by the teacher on the first display surface.

Based on the above description, the control device may control the at least one first cast light source capable of casting the virtual image on the first display surface to cast the first virtual scene image on the first display surface. At the same time, based on a cast light path of the at least one cast light source, the control device determines the sub-grating area of the second diffraction grating superimposed on the second display surface within the coverage area of the corresponding light path. Through adjusting the sub-grating area of the second diffraction grating to be in the opaque state, the contents inputted by the teacher are made invisible on the second display surface, such that the multiple students cannot see the contents inputted by the teacher on the first display surface.

For example, as shown in FIG. 2, for each student, the teacher writes a score for the student at a position of the transparent holographic display screen corresponding to the student. The scores for the students can only be seen by the teacher, but not by the students.

It should be understood that in this case, for illustration purpose, the first virtual scene image presented on the first display surface is the contents inputted by the teacher on the first display surface. In practical application, the first virtual scene image may also be a virtual scene image pre-configured by the teacher or currently selected for output, which is not limited thereto. For example, as shown in FIG. 2, the teacher can also see some operation options that can only be selected by the teacher on the first display surface. For example, the operation options may include liking a certain student or triggering an icon to applaud to the student. These contents are displayed only on the first display surface, and cannot be seen by the student at the side of the second display surface.

In practical applications, to achieve the privacy of viewing the virtual scene images among the multiple users on the same side of the transparent holographic display screen, different virtual scene images need to be presented with different users at the same side of the transparent holographic display screen. Thus, the users at different positions at the same side of the transparent holographic display screen can see different virtual scene images.

Figure 3:
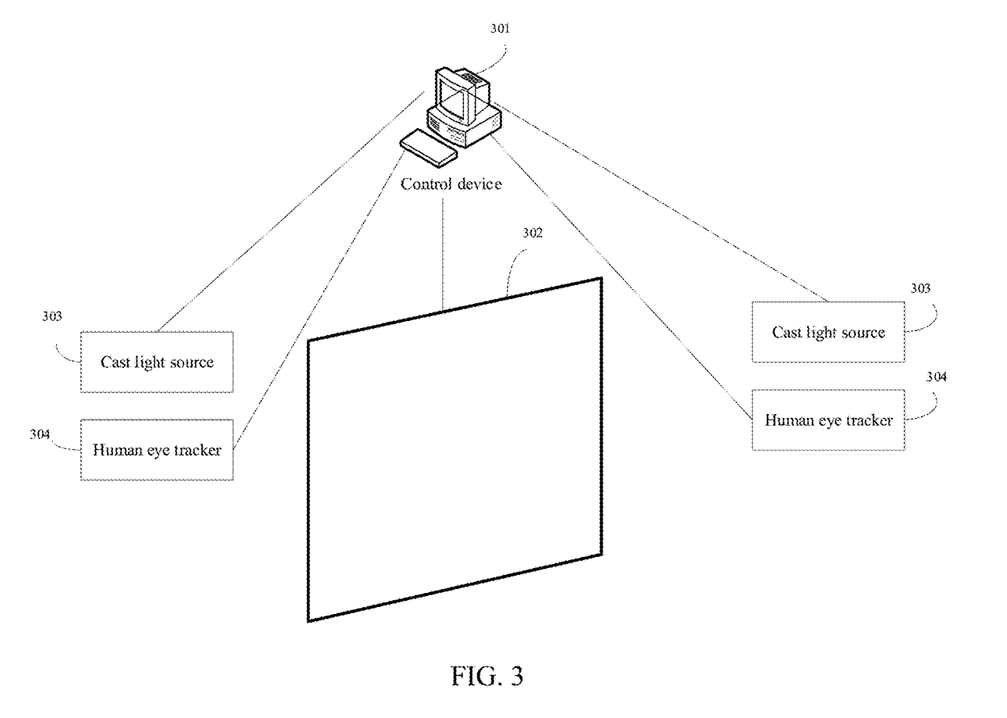
FIG. 3 is a schematic structural diagram of another exemplary image cast system according to some embodiments of the present disclosure.

To achieve this objective, the image cast system of the present disclosure may also include at least one human eye tracker. FIG. 3 is a schematic structural diagram of another exemplary image cast system according to some embodiments of the present disclosure. As shown in FIG. 3, in addition to a control device 301, a transparent holographic display screen 302, a plurality of cast light sources 303, a first diffraction grating (not shown) superimposed on a first display surface of the transparent holographic display screen, and a second diffraction grating (not shown) superimposed on a second display surface of the transparent holographic display screen, the image cast system also includes the at least one human eye tracker 304. Reference can be made to the related description in the previous embodiments for connection relationship between the control device, the transparent holographic display screen, the cast light sources, the first diffraction grating, and the second diffraction grating.

In some embodiments, the at least one human eye tracker 304 is connected to the control device 301. The at least one human eye tracker can collect position data of user's eyes, which can be used to locate the user's eye position. The at least one human eye tracker may be disposed in a physical environment where the transparent holographic display screen is located.

In this case, the control device may control the at least one second cast light source from the plurality of cast light sources to cast the second virtual scene image onto the second display surface of the transparent holographic display screen, and sends the second electrical control sub-signal to the second diffraction grating. The second electrical control sub-signal is configured to control the diffraction coefficient of the at least one second sub-grating area in the light path from the at least one second cast light source of the second diffraction grating to the target user. Thus, the second virtual scene image cast by the at least one second cast light source is only cast to the target user's eyes through the at least one second sub-grating area.

The target user is the user located at the side of the second display surface of the transparent holographic display screen. Under the circumstance that multiple users are located at the side of the second display surface, for different target users, at least one second cast light source for casting the second virtual scene image onto the second display surface is different. For different target users, the second virtual scene image cast to the target user's eye position through the second display surface is also different. Generally, the second virtual scene images corresponding to multiple target users are not exactly the same. Specific configurations may be set as needed.

The second cast light sources belong to at least one cast light source from the plurality of cast light sources that can cast the virtual image onto the second display surface of the transparent holographic display screen. For example, the second cast light sources belong to the cast light sources disposed outside the transparent holographic display screen and facing toward the second display surface of the transparent holographic display screen.

For convenience of differentiation, the virtual scene image that needs to be cast onto the second display surface is called the second virtual scene image. Because the second virtual scene image needs to be cast by the second cast light sources through the second display surface and the second diffraction grating to the target user's eye position, the second virtual scene image is presented only to the target user located at the side of the second display surface of the transparent holographic display screen, and is invisible to users located at the side of the second display surface other than the target user.

To cast the second virtual scene image by the second cast light sources through the second display surface and the second diffraction grating to the target user's eye position, the present disclosure may determine information such as the diffraction coefficient that needs to be satisfied by the second sub-grating area based on the cast light path from the at least one second cast light source to the target user's eye position when the at least one second cast light source casts to the target user's eye position through the at least one second sub-grating area of the second diffraction grating. Correspondingly, the second electrical control sub-signal is sent to the second diffraction grating to adjust the diffraction coefficient corresponding to the second sub-grating area.

It can be understood that there are many variations of the at least one human eye tracker in the image cast system in FIG. 3.

In one embodiment, the at least one human eye tracker is an image collector. As such, the image collector collects user's images. The user's images include user's eye images. The user's images are analyzed to obtain the position data of the user's eye position.

In addition, the control device determines the user's eye position based on the user's images collected by one or more human eye trackers. For example, the user's images are used to determine human face image areas, and the human face image areas are used to determine the human eye positions. The human eye positions are combined with the positions of the one or more human eye trackers to calculate the user's eye position. Under the circumstance that the user's images are known, there are various manners to calculate the user's eye position, which is not limited thereto.

In one embodiment, the at least one human eye tracker may be a sensor for sensing the user's position, such as an infrared detector. As such, the at least one human eye tracker may sense related auxiliary information for locating the user's eye position, such as the user's position.

Correspondingly, the control device may incorporate the auxiliary information that is collected by the at least one human eye tracker for locating the user's eye position to calculate the user's eye position. Description of specific calculations is omitted herein.

Based on the above description, there are various forms of the second diffraction grating. For example, in one embodiment, the second diffraction grating may be a diffraction grating with adjustable grating spacing. In this case, the control device sends the second electrical control sub-signal to adjust a physical grating spacing for the second sub-grating area. Correspondingly, the second diffraction grating is controlled by the second electrical control sub-signal to adjust the grating spacing in the second sub-grating area, such that the second sub-grating area has the diffraction coefficient required to cast the second virtual scene image to the target user's eyes.

In one embodiment, the second diffraction grating may be a diffraction grating with controllable diffraction coefficient. Correspondingly, the second electrical control sub-signal is configured to control the diffraction coefficient of the at least one second sub-grating area of the second diffraction grating to be a target diffraction coefficient. Making the diffraction coefficient of the at least one second sub-grating area the target diffraction coefficient facilitates the at least one second sub-grating area to cast the second virtual scene image to the target user's eyes.

In some embodiments, in the image cast system shown in FIG. 3, the control device determines the user located at the side of the second display surface of the transparent holographic display screen. At the same time, the control device can make each user at the side of the second display surface as a target user, and cast different second virtual scene images to different target users through the second display surface and the second diffraction grating according to actual needs.

In one embodiment, to cast the virtual scene image more specifically to the user at the side of the second display surface, a first user located at the side of the first display surface of the transparent holographic display screen may select one user located at the side of the second display surface of to be the target user. For convenience of differentiation, the user located at the side of the first display surface of the transparent holographic display screen is called the first user, and the user located at the side of the second display surface of the transparent holographic display screen is called the second user.

Specifically, the image cast system shown in FIG. 3 may also include at least one interactive sensor (not shown). The at least one interactive sensor collects input operation data inputted by the first user on the first display surface and sends the input operation data to the control device.

In one embodiment, the at least one interactive sensor may be disposed outside the transparent holographic display screen, and is connected to the control device. For example, the at least one interactive sensor may be an image collector. The image collector may collect the input operation data inputted by the first user at the side of the first display surface on the first display surface. In addition, the at least one interactive sensor may also be a sensor used in mixed reality or augmented reality technology that can locate the user's body movement and behavior, which is not limited thereto.

In one embodiment, the at least one interactive sensor may be disposed at a touch sensing unit of the transparent holographic display screen. In this case, the at least one interactive sensor is connected to the control device through the transparent holographic display screen.

The image cast system may also be configured with various types of interactive sensors at the same time to more completely and accurately determine the input operation data inputted by the user.

Correspondingly, the control device determines the target user selected by the first user based on the input operation data inputted by the first user. The target user belongs to at least one second user at the side of the second display surface of the transparent holographic display screen.

For convenience of understanding, another application scenario is described below.

Figure 4:
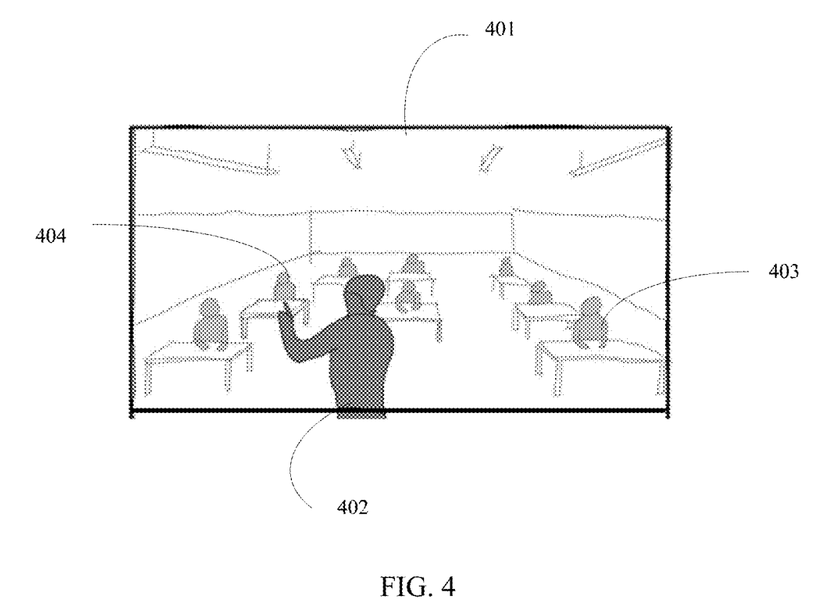
FIG. 4 is a schematic diagram showing another application scenario of an exemplary image cast system according to some embodiments of the present disclosure.

FIG. 4 is a schematic diagram showing another application scenario of an exemplary image cast system according to some embodiments of the present disclosure. For convenience of description, the teaching scenario is used as an example of the application scenarios. As shown in FIG. 4, a teacher 402 is located at the side of the first display surface of the transparent holographic display screen 401. The teacher 402 can see students 403 in different seats in a classroom through the transparent holographic display screen 401, and the students 403 are located at the side of the second display surface of the transparent holographic display screen 401.

As such, if the teacher 402 wants to output a particular virtual scene image to a particular student in the particular classroom, the teacher 402 can click the student at a student's position the teacher can see on the transparent holographic display screen 401. As shown in FIG. 4, the teacher 402 clicks a target student 404 in a second row of a leftmost column, and the target student 404 is the target user selected by the teacher 402.

Correspondingly, the control device may obtain classroom images collected by at least one image collection apparatus (generally more than one) disposed in the classroom. Based on the classroom images, the control device determines the target student 404 to which the input operation date inputted by the teacher 402 on the first display surface of the transparent holographic display screen 401 is directed.

In another embodiment, the control device uses the touch sensing unit of the transparent holographic display screen 401 to determine an input position of the input operation data inputted by the teacher 402. The input position and a position of each student relative to the transparent holographic display screen 401 (pre-configured or determined through the student images collected by the image collection apparatuses) are combined to determine the target student 404 to which the input position is directed.

Based on the above description, in one embodiment, the control device determines the second virtual scene image that needs to be cast to the target student 404. For example, after the control device determines the target student 404 selected by the teacher 402, the teacher 402 can input contents at a position of the target student 404 on the first display surface as the second virtual scene image to be presented to the target student 404. In another embodiment, after the control device determines the target student 404 selected by the teacher 402, the control device can display operation options at the corresponding position of the target student 404 on the first display surface of transparent holographic display screen 401, such as applause or smile as shown in FIG. 2. In addition, the virtual scene image triggered by the operation options, e.g., applause or smile, selected by the teacher 402 can be determined as the second virtual scene image to be presented to the target student 404.

Further, based on the target student's eye position, the control device determines the at least one second cast light source needed for casting the second virtual scene image to the target student, and controls the at least one second cast light source to cast the second virtual scene image onto the second display surface. At the same time, based on the cast light path from the at least one second cast light source to the target student's eye position, the control device determines diffraction coefficient for the sub-grating area of the second diffraction grating along the cast light path. Through controlling the sub-grating area to have the corresponding diffraction coefficient, the control device controls the sub-grating area to diffract the second virtual scene image cast by the at least one second cast light source to the target student's eyes, such that the second virtual scene image intended for the target student by the teacher can be seen only by the target student, but not by other students.

Figure 5:
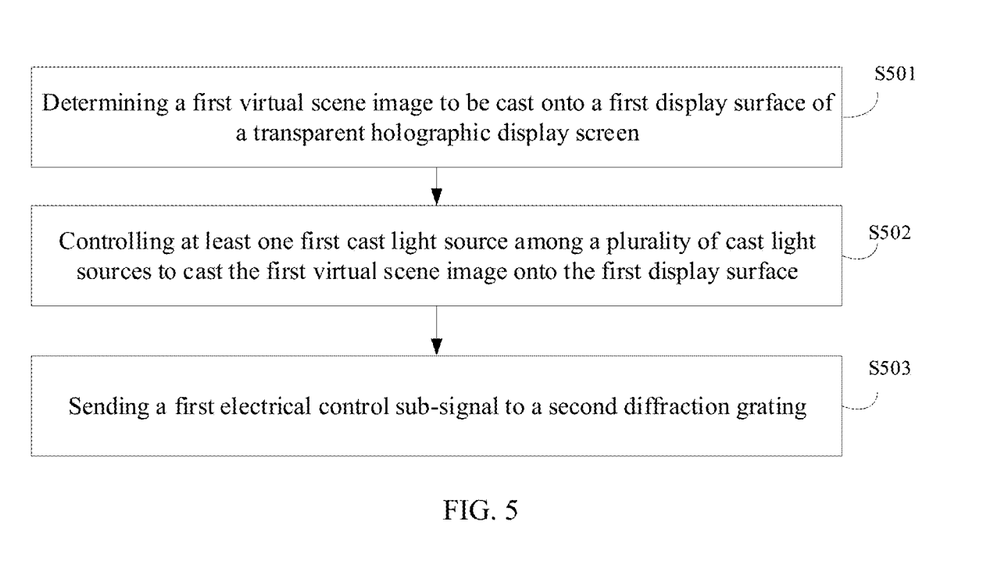
FIG. 5 is a flowchart of an exemplary image cast method according to some embodiments of the present disclosure.

The present disclosure also provides an image cast method. The image cast method can be applied to the control device in the image cast system in any previously described embodiments. FIG. 5 is a flowchart of an exemplary image cast method according to some embodiments of the present disclosure. The image cast method includes the following processes.

At S501, a first virtual scene image to be cast onto a first display surface of a transparent holographic display screen is determined.

The first display surface of transparent holographic display screen is superimposed with a first diffraction grating, and a second display surface is superimposed with a second diffraction grating. For details, reference can be made to the description of the previous embodiments, and will not be repeated herein.

For example, after an input operation by a first user located at the side of the first display surface on the first display surface is detected, the first virtual scene image to be cast is determined based on the input operation. In another example, the first virtual scene image is determined based on the virtual scene image that is cast on the first display surface before the current moment. There may be other methods of determining the first virtual scene image, which are not limited thereto.

At S502, at least one first cast light source from a plurality of cast light sources is controlled to cast the first virtual scene image onto the first display surface.

For example, the at least one first cast light source capable of casting the first virtual scene image onto the first display surface can be determined from the plurality of cast light sources. The at least one first cast light source is then controlled to cast the first virtual scene image onto the first display surface.

At S503, a first electrical control sub-signal is sent to a second diffraction grating.

In some embodiments, the first electrical control sub-signal is configured to control at least one first sub-grating area of the second diffraction grating in a light cast area of the at least one first cast light source to be in an opaque state. Thus, the first sub-grating area blocks the first virtual scene image cast by the at least one first cast light source to make the first virtual scene image invisible on the second display surface.

It should be noted that the order of S502 and S503 may not be limited to what has been shown in FIG. 5. In practical applications, to minimize the visibility of the first virtual scene image on the second display surface, S503 can also be performed before S502 or at the same time as the S502.

Reference can be made to the related processes performed by the control device in the previously described image cast system, and details will not be repeated herein.

In the embodiments of the present disclosure, a second virtual scene image can be cast to a second user located at the side of the second display surface of the transparent holographic display screen, such that the second user located at the side of the second display surface of transparent holographic display screen can see a different virtual scene image, and the content that can be seen at the second user's position cannot be seen by other second users. That is, privacy of the content seen by each second user is protected.

To achieve this objective, the control device also determines a target user located at the side of the second display surface of transparent holographic display screen, controls the at least one second cast light source from the plurality of cast light sources to cast the second virtual scene image onto the second display surface, and sends a second electrical control sub-signal to the second diffraction grating. The second electrical control sub-signal is configured to control the diffraction coefficient of at least one second sub-grating area of the second diffraction grating in the cast light path from the at least one second cast light source to the target user's eye position to cast the second virtual scene image only to the target user's eyes through the at least one second sub-grating area.

In some embodiments, determining the target user includes: collecting input operation data inputted by a first user located at a side of the first display surface of transparent holographic display screen on the first display surface, and determining the target user based on an input position of an input operation on the first display surface indicated by the input operation data and a position of at least one second user located at a side of the second display surface. For example, the input position points to the position of a certain second user, who is the target user.

It should be understood that to facilitate the second user to see a three-dimensional (3D) virtual scene image and to minimize the possibility that two second users at different positions see a same virtual scene image due to the proximity of the two second users, the present disclosure can also cast different virtual scene images to the left eye and the right eye, respectively. Thus, a parallax of the second user's eyes makes the second user see the 3D virtual scene image formed by combining the two virtual scene images cast to the second user's left eye and the second user's right eye.

Figure 6:
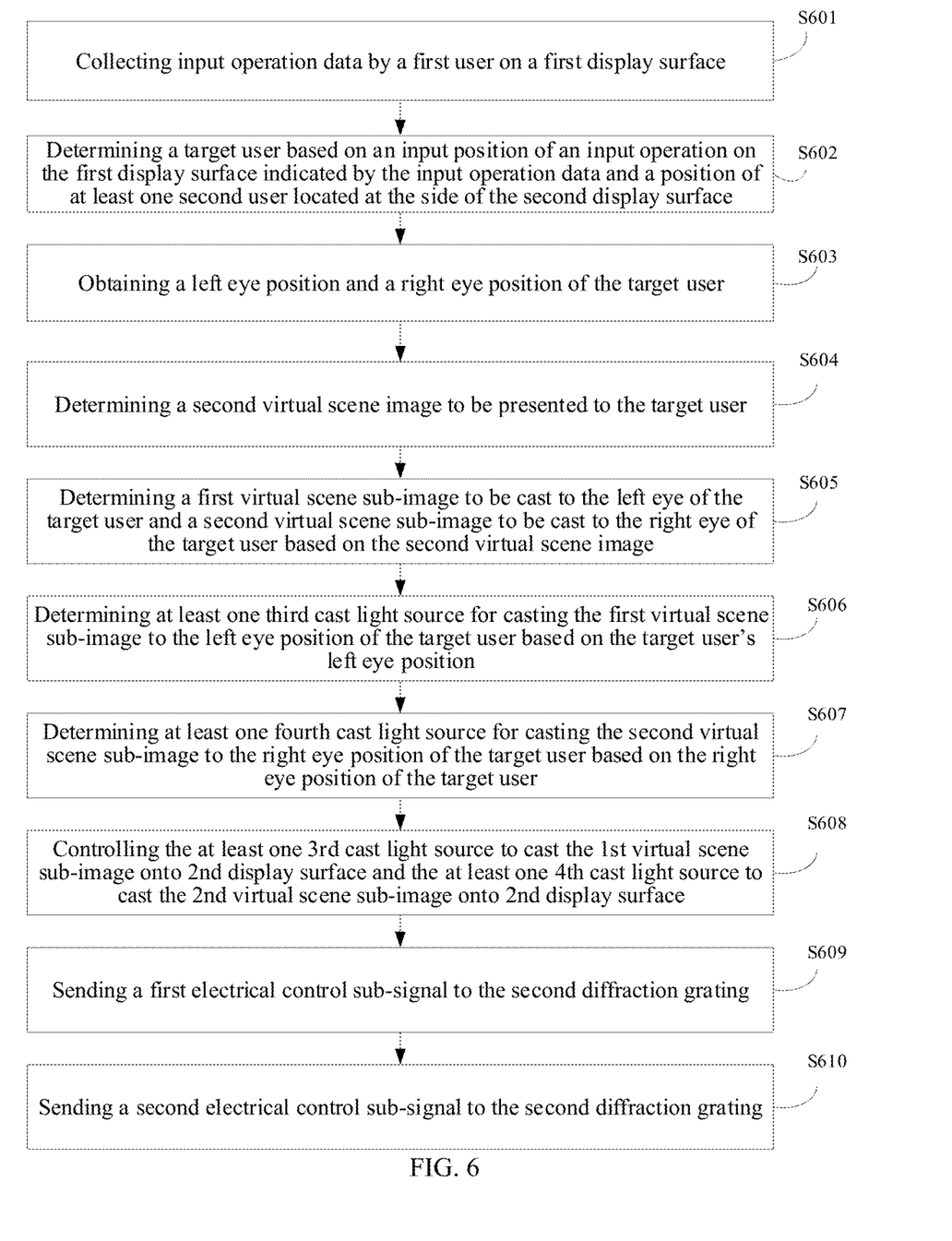
FIG. 6 is a flowchart of casting a second virtual scene image to a target user in an exemplary image cast method according to some embodiments of the present disclosure.

FIG. 6 is a flowchart showing casting a second virtual scene image to a target user in an exemplary image cast method according to some embodiments of the present disclosure. The method can be applied to the control device in the image cast system in any previously described embodiments. As shown in FIG. 6, the method includes the following processes.

At S601, an input operation by a first user on a first display surface is collected.

The first user is located at a side of the first display of the transparent holographic display screen.

At S602, a target user intended is determined based on an input position of an input operation on the first display surface indicated by the input operation data and a position of at least one second user located at the side of the second display surface of the transparent holographic display screen.

The target user belongs to at least one second user.

S601 and S602 are one method of determining the target user. Other methods of determining the target user described in the previous embodiments are also applicable.

At S603, a left eye position and a right eye position of the target user are obtained.

In some embodiments, the left eye position and the right eye position of the target user may be determined in the same methods as the target user's eye position is determined in the previous embodiments. For example, the left eye position and the right eye position of the target user may be determined by analyzing the target user's image collected by the image collection apparatus. The left eye position and the right eye position of the target user may be determined by analyzing the target user's position data sensed by the infrared sensors. The present disclosure does not limit the methods of determining the left eye position and the right eye position of the target user.

At S604, a second virtual scene image to be presented to the target user is determined.

For example, the second virtual scene image can be determined based on the input operation or section operation by the first user located on the side of the first display surface of the transparent holographic display screen. The present disclosure does not limit the method by which the second virtual scene image to be presented to the target user is determined, and other methods are also applicable.

At S605, based on the second virtual scene image, a first virtual scene sub-image to be cast to the left eye of the target user and a second virtual scene sub-image to be cast to the right eye of the target user are determined.

In some embodiments, the first virtual scene sub-image and the second virtual scene sub-image are used to superimpose and generate the 3D second virtual scene image.

For example, the first virtual scene sub-image and the second virtual scene sub-image are obtained based on virtual scene sub-images corresponding to the stored second virtual scene image.

At S606, based on the left eye position the target user, at least one third cast light source for casting the first virtual scene sub-image to the left eye position of the target user is determined.

At S607, based on the right eye position of the target user, at least one fourth cast light source for casting the second virtual scene sub-image to the right eye position of the target user is determined.

The at least one third cast light source and the at least one fourth cast light source actually belong to the at least one second cast light source corresponding to the target user. The at least one third cast light source belongs to some or all of cast light sources capable of casting through the second display surface to the target user's left eye. The at least one fourth cast light source belongs to some or all of cast light sources capable of casting through the second display surface to the target user's right eye.

At S608, the at least one third cast light source is controlled to cast the first virtual scene sub-image onto the second display surface and the at least one fourth cast light source is controlled to cast the second virtual scene sub-image onto the second display surface, to present to the target user the second virtual scene image formed by superimposing the first virtual scene sub-image and the second virtual scene sub-image.

At S609, a first electrical control sub-signal is sent to the second diffraction grating.

In some embodiments, the first electrical control sub-signal is configured to control at least one third sub-grating area of the second diffraction grating in the cast light path from the at least one third cast light source to the target user's left eye position to have a first diffraction coefficient, such that the first virtual scene sub-image cast by the at least one third cast light source can be cast through the at least one third sub-grating area to the target user's left eye. Under the circumstance that the third sub-grating area has the first diffraction coefficient, after the first virtual scene sub-image cast by the at least one third cast light source reaches the third sub-grating area through the second display surface, the grating diffraction in the third sub-grating area facilitates the first virtual scene sub-image to be cast to the target user's left eye position.

At S610, a second electrical control sub-signal is sent to the second diffraction grating.

In some embodiments, the second electrical control sub-signal is configured to control at least one fourth sub-grating area of the second diffraction grating in the cast light path from the at least one fourth cast light source to the target user's right eye position to have a second diffraction coefficient, such that the second virtual scene sub-image cast by the at least one fourth cast light source can be cast through the at least one fourth sub-grating area to the target user's right eye. Similarly, under the circumstance that the fourth sub-grating area has the second diffraction coefficient, after the second virtual scene sub-image cast by the at least one fourth cast light source reaches the fourth sub-grating area through the second display surface, the grating diffraction in the fourth sub-grating area facilitates the second virtual scene sub-image to be cast to the target user's right eye position.

In the embodiments of the present disclosure, because the first virtual scene sub-image can only be cast to the target user's left eye and the second virtual scene sub-image can only be cast to the target user's right eye, based on the two eye's parallax, the target user can see the 3D second virtual scene image superimposed by the first virtual scene sub-image and the second virtual scene sub-image. In addition, because the control device controls the plurality of cast light sources and diffraction coefficient of the second diffraction grating, the target user's left eye can only see the first virtual scene sub-image and the target user's right can only see the second virtual scene sub-image. Thus, the only the target user can see the superimposed second virtual scene image while the other users located at the side of the second display surface of the transparent holographic display screen cannot see the second virtual scene image, thereby improving the privacy protection of the virtual scene images.

In the embodiments of the present disclosure, the first virtual scene image can be controlled to be seen only at a certain first user's position at the side of the first display surface of the transparent holographic display screen, and not to be seen at other user's positions at the side of the first display surface of the transparent holographic display screen.

Figure 7:
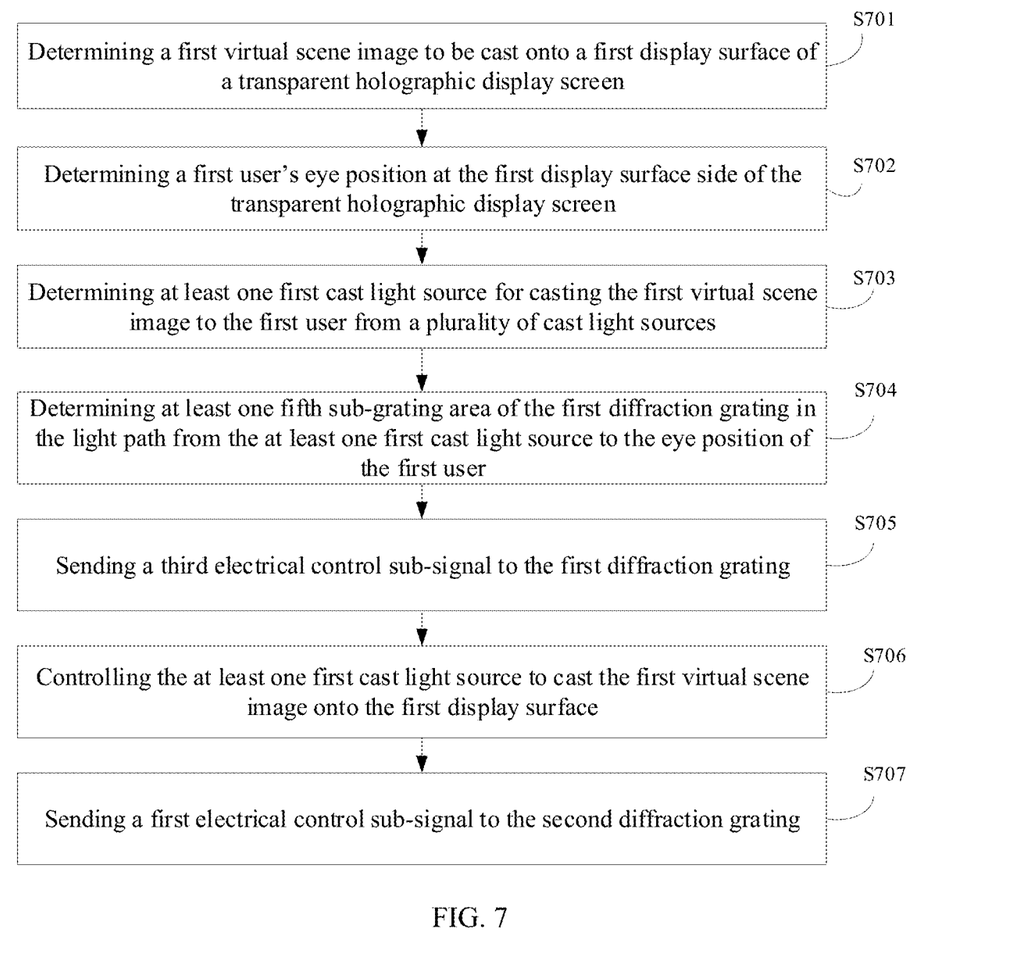
FIG. 7 is a flowchart of another exemplary image cast method according to some embodiments of the present disclosure.

FIG. 7 is a flowchart of another exemplary image cast method according to some embodiments of the present disclosure. The image cast method can be applied to the control device in the image cast system described in the previous embodiments. As shown in FIG. 7, the image cast method includes the following processes.

At S701, a first virtual scene image to be cast onto a first display surface of a transparent holographic display screen is determined.

At S702, an eye position of a first user at a side of the first display surface of the transparent holographic display screen is determined.

The specific methods of determining the first user's eye position are similar to the methods of determining the target user's eye position, and details will not be repeated herein.

At S703, at least one first cast light source for casting the first virtual scene image to the first user is determined from a plurality of cast light sources.

For example, the at least one first cast light source capable of casting to the first user's eye position can be determined according to a light cast angle of each cast light source and the first user's eye position.

At S704, at least one fifth sub-grating area of the first diffraction grating in the cast light path from the at least one first cast light source to the eye position of the first user is determined.

The at least one fifth sub-grating area is a diffraction grating area of the first diffraction grating in the cast light path from the at least one first cast light source to the first user's eye position. Thus, the diffraction coefficient of the at least one fifth sub-grating area needs to be adjusted to facilitate the at least one fifth sub-grating area to diffract the light cast thereon by the at least one first cast light source to the first user's eye position.

At S705, a third electrical control sub-signal is sent to the first diffraction grating.

In some embodiments, the third electrical control sub-signal is configured to control the diffraction coefficient of the at least one fifth sub-grating area to facilitate the first virtual scene image cast by the at least one first cast light source to diffract through the at least one fifth sub-grating area to the first user's eye position.

For example, when the first diffraction grating is a diffraction grating with a physically adjustable grating spacing, the third electrical control sub-signal is configured to indicate the grating spacing in the at least one fifth sub-grating area of the first diffraction grating, such that the diffraction coefficient of the at least one fifth sub-grating area can satisfy a cast requirement for the first virtual scene image cast by the at least one cast light source to be diffracted to the first user's eye position.

In another example, the first diffraction grating is a diffraction grating with a controllable diffraction coefficient. The third electrical control sub-signal is configured to control the diffraction coefficient of the at least one fifth sub-grating area to be a specified diffraction coefficient. When the at least one fifth sub-grating area has the specified diffraction coefficient, the at least one fifth sub-grating area can diffract the first virtual scene image cast by the at least one first cast light source to the first user's eye position.

At S706, the at least one first cast light source is controlled to cast the first virtual scene image onto the first display surface.

For example, the at least one first cast light source capable of casting the first virtual scene image onto the first display surface is determined from the plurality of cast light sources, and the at least one first cast light source is then controlled to cast the first virtual scene image.

At S707, a first electrical control sub-signal is sent to the second diffraction grating.

In some embodiments, the first electrical control sub-signal is configured to control at least one first sub-grating area of the second diffraction grating in the light cast area of the at least one first cast light source, such that the first sub-grating area blocks the first virtual scene image cast by the at least one first cast light source to make the first virtual scene image invisible on the second display surface.

Figure 8:
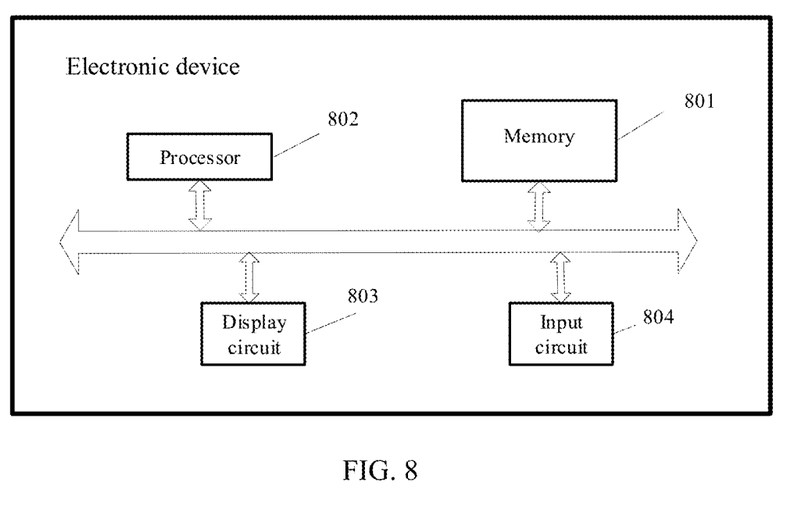
FIG. 8 is a schematic structural diagram of an exemplary electronic device according to some embodiments of the present disclosure.

The present disclosure also provides an electronic device. FIG. 8 is a schematic structural diagram of an exemplary electronic device according to some embodiments of the present disclosure. The electronic device can be any types of electronic devices. As shown in FIG. 8, the electronic device at least includes a memory 801 and a processor 802. The processor 801 is configured to perform the image cast method of any of the previously described embodiments. The memory 802 is configured to store programs needed for the processor 802 to perform operations.

In some embodiments, the electronic device may further include a display circuit 803 and an input circuit 804. In some other embodiments, the electronic device may include more or less components than what have been shown in FIG. 8, which are not limited by the present disclosure.

The present disclosure also provides a computer-readable storage medium. The computer-readable storage medium stores at least one instruction, at least one section of a program, a code set or an instruction set. The at least one instruction, the at least one section of the program, the code set or the instruction set will be loaded and executed by a processor to implement the image cast method described in any one of the above-described embodiments.

The present disclosure also provides a computer program. The computer program includes computer instructions. The computer instructions may be stored in the computer-readable storage medium. The computer program is executed by an electronic device to perform the image cast method described in any one of the above-described embodiments.

Various embodiments in the specification are described in a progressive manner, and each embodiment focuses on the differences from other embodiments, and for the same and similar parts between the various embodiments, reference can be made to each other. At the same time, the features described in the embodiments in the specification may be replaced or combined with each other, such that those skilled in the art can realize or use the present disclosure. As for the devices disclosed in the embodiments, because of the correspondence to the method disclosed in the embodiments, the description is relatively simple, and reference can be made to the description of the method for relevant parts.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

Those skilled in the art can further realize that the units and algorithm steps of the examples described in the embodiments disclosed in the specification can be implemented by electronic hardware, computer software, or a combination of both. To clearly illustrate interchangeabilities of hardware and software, the structures and steps of each example have been generally described in the specification in accordance with the functions. Whether these functions are implemented by hardware or software depends on the specific application and design constraints of the technical solution. Those skilled in the art can use different methods for each specific application to implement the described functions, but such implementation should not be considered beyond the scope of this application.

The steps of the method or algorithm described in the embodiments disclosed in the specification can be directly implemented by hardware, a software module executed by a processor, or a combination thereof. The software module can be stored in random access memory (RAM), internal memory, read-only memory (ROM), electrically programmable ROM, electrically erasable programmable ROM, registers, hard disks, removable disks, CD-ROMs, or any other storage media known in the technical field.

The above description of the disclosed embodiments enables those skilled in the art to implement or use this application. Various modifications to these embodiments will be obvious to those skilled in the art, and the general principles defined herein can be implemented in other embodiments without departing from the spirit or scope of the present application. Therefore, this application will not be limited to the embodiments shown in the specification, but should conform to the broadest scope consistent with the principles and novelties disclosed in the specification.

What is claimed is:

1. An image cast system comprising:
a transparent holographic display screen;
a first diffraction grating superimposed at a first display surface of the transparent holographic display screen;
a second diffraction grating superimposed at a second display surface of the transparent holographic display screen;
a plurality of cast light sources including a cast light source disposed outside and facing towards the transparent holographic display screen or a cast light source disposed inside the transparent holographic display screen; and
a control device connected to the transparent holographic display screen, the first diffraction grating, the second diffraction grating, and the plurality of cast light sources,
wherein the control device controls at least one cast light source of the plurality of cast light sources to cast a virtual scene image onto the first display surface of the transparent holographic display screen; and outputs an electrical control signal to the second diffraction grating to control at least one sub-grating area, of the second diffraction grating, in a light cast area of the at least one cast light source to be in an opaque state, such that the at least one sub-grating area blocks the virtual scene image cast by the at least one cast light source to make the virtual scene image invisible on the second display surface.

2. The image cast system according to claim 1, further comprising:
at least one human eye tracker connected to the control device and collecting position data of an eye of a target user, the position data being used to locate a position of the eye of the target user, and the target user being located at a side of the second display surface of the transparent holographic display screen;
wherein:
the at least one cast light source is at least one first cast light source, the virtual scene image is a first virtual scene image, the electrical control signal is a first electrical control sub-signal, and the at least one sub-grating area is at least one first sub-grating area; and
the control device further:
controls at least one second cast light source of the plurality of cast light sources to cast a second virtual scene image onto the second display surface of the transparent holographic display screen; and
outputs a second electrical control sub-signal to the second diffraction grating to control a diffraction coefficient of at least one second sub-grating area, of the second diffraction grating, in a light path from the at least one second cast light source to the position of the eye of the target user, such that the second virtual scene image cast by the at least one second cast light source is only cast to the position of the eye of the target user through the at least one second sub-grating area.

3. The image cast system according to claim 2, further comprising:
at least one interactive sensor that is disposed outside the transparent holographic display screen and connected to the control device, or disposed at a touch sensing unit of the transparent holographic display screen and connected to the control device through the transparent holographic display screen;
wherein:
the at least one interactive sensor collects input operation data inputted by a first user on the first display surface and sends the input operation data to the control device, the first user being located at a side of the first display surface of the transparent holographic display screen; and
the control device is further configured to determine, according to the input operation data, the target user from at least one second user located at the side of the second display surface of the transparent holographic display screen.

4. The image cast system according to claim 2, wherein:
a grating spacing of each of the first diffraction grating and the second diffraction grating is adjustable;
based on the first electrical control sub-signal, the second diffraction grating reduces the grating spacing in the at least one first sub-grating area until the at least one first sub-grating area is in the opaque state; and
based on the second electrical control sub-signal, the second diffraction grating adjusts the grating spacing in the at least one second sub-grating area, such that the at least one second sub-grating area has the diffraction coefficient needed to cast the second virtual scene image to the position of the eye of the target user.

5. The image cast system according to claim 2, wherein:
a diffraction coefficient of each of the first diffraction grating and the second diffraction grating is controllable;
the first electrical control sub-signal is configured to control the diffraction coefficient of the at least one first sub-grating area of the second diffraction grating to be a diffraction coefficient corresponding to the opaque state; and
the second electrical control sub-signal is configured to control the diffraction coefficient of the at least one second sub-grating area of the second diffraction grating to be a target diffraction coefficient, such that the at least one second sub-grating area casts the second virtual scene image to the position of the eye of the target user.

6. An image cast method comprising:
determining a virtual scene image to be cast onto a first display surface of a transparent holographic display screen, the transparent holographic display screen including the first display surface, a second display surface, a first diffraction grating superimposed at the first display surface, and a second diffraction grating superimposed at the second display surface;
controlling at least one cast light source of a plurality of cast light sources to cast the virtual scene image onto the first display surface; and
outputting an electrical control sub-signal to the second diffraction grating to control at least one sub-grating area, of the second diffraction grating, in a light cast area of the at least one cast light source to be in an opaque state, such that the at least one sub-grating area blocks the virtual scene image cast by the at least one cast light source to make the virtual scene image invisible on the second display surface.

7. The method according to claim 6, wherein the at least one cast light source is at least one first cast light source, the virtual scene image is a first virtual scene image, the electrical control signal is a first electrical control sub-signal, and the at least one sub-grating area is at least one first sub-grating area; the method further comprising:
   determining a target user located at a side of the second display surface of the transparent holographic display screen;
   controlling at least one second cast light source of the plurality of cast light sources to cast a second virtual scene image onto the second display surface; and
   sending a second electrical control sub-signal to the second diffraction grating to control a diffraction coefficient of at least one second sub-grating area, of the second diffraction grating, in a light path from the at least one second cast light source to the position of the eye of the target user, such that the second virtual scene image cast by the at least one second cast light source is only cast to the position of the eye of the target user through the at least one second sub-grating area.

8. The method according to claim 7, wherein determining the target user includes:
   collecting input operation data inputted by a first user on the first display surface, the first user being located at a side of the first display surface of the transparent holographic display screen; and
   determining the target user based on an input position of an input operation on the first display surface indicated by the input operation data and a position of at least one second user located at the side of the second display surface.

9. The method according to claim 7, wherein:
   a grating spacing of each of the first diffraction grating and the second diffraction grating is adjustable;
   the first electrical control sub-signal is configured to control the second diffraction grating to reduce the grating spacing in the at least one first sub-grating area until the at least one first sub-grating area is in the opaque state; and
   the second electrical control sub-signal is configured to control the second diffraction grating to adjust the grating spacing in the at least one second sub-grating area, such that the at least one second sub-grating area has the diffraction coefficient needed to cast the second virtual scene image to the position of the eye of the target user.

10. The method according to claim 7, wherein:
    a diffraction coefficient of each of the first diffraction grating and the second diffraction grating is controllable;
    the first electrical control sub-signal is configured to control the diffraction coefficient of the at least one first sub-grating area of the second diffraction grating to be a diffraction coefficient corresponding to the opaque state; and
    the second electrical control sub-signal is configured to control the diffraction coefficient of the at least one second sub-grating area of the second diffraction grating to be a target diffraction coefficient, such that the at least one second sub-grating area casts the second virtual scene image to the position of the eye of the target user.

11. The method according to claim 7, further comprising:
    obtaining a left eye position and a right eye position of the target user before sending the second electrical control sub-signal to the second diffraction grating;
    wherein controlling the at least one second cast light source to cast the second virtual scene image onto the second display surface includes:
    determining the second virtual scene image;
    determining a first virtual scene sub-image and a second virtual scene sub-image based on the second virtual scene image;
    determining at least one third cast light source for casting the first virtual scene sub-image based on the left eye position of the target user;
    determining at least one fourth cast light source for casting the second virtual scene sub-image based on the right eye position of the target user;
    controlling the at least one third cast light source to cast the first virtual scene sub-image onto the second display surface and the at least one fourth cast light source to cast the second virtual scene sub-image onto the second display surface, to present the second virtual scene image formed by superimposing the first virtual scene sub-image and the second virtual scene sub-image.

12. The method according to claim 11, wherein sending the second electrical control sub-signal to the second diffraction grating includes:
    sending a first electrical control sub-signal to the second diffraction grating to control at least one third sub-grating area, of the second diffraction grating, in a light path from the at least one third cast light source to the left eye position of the target user to have a first diffraction coefficient, such that the first virtual scene sub-image cast by the at least one third cast light source is cast through the at least one third sub-grating area only to the left eye position of the target user; and
    sending a second electrical control sub-signal to the second diffraction grating to control at least one fourth sub-grating area, of the second diffraction grating, in a light path from the at least one fourth cast light source to the right eye position of the target user to have a second diffraction coefficient, such that the second virtual scene sub-image cast by the at least one fourth cast light source is cast through the at least one fourth sub-grating area only to the right eye position of the target user.

13. The method according to claim 6, further comprising, before controlling the at least one cast light source to cast the virtual scene image onto the first display surface:
    determining an eye position of a user located at a side of the first display surface of the transparent holographic display screen;
    determining the at least one cast light source for casting the first virtual scene image to the user; and
    determining at least one sub-grating area, of the first diffraction grating, in a light path from the at least one cast light source to an eye position of the user.

14. The method according to claim 13, further comprising, before or at same time as controlling the at least one cast light source to cast the virtual scene image onto the first display surface:
    sending another electrical control signal to the first diffraction grating to control a diffraction coefficient of the at least one sub-grating area of the first diffraction grating, such that the at least one sub-grating area of the first diffraction grating diffracts the virtual scene image cast by the at least one cast light source to the eye position of the user.

* * * * *